(12) United States Patent
Koay et al.

(10) Patent No.: US 11,443,073 B2
(45) Date of Patent: Sep. 13, 2022

(54) TECHNIQUES FOR PREVENTING VOLTAGE TAMPERING OF SECURITY CONTROL CIRCUITS

(71) Applicant: Intel Corporation, Santa Clara, CA (US)

(72) Inventors: Wei Yee Koay, Penang (MY); Ting Lu, Austin, TX (US); Ching Kooi Hor, Penang (MY); Chin Ghee Ch'ng, Penang (MY)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 16/222,564

(22) Filed: Dec. 17, 2018

(65) Prior Publication Data

US 2019/0138754 A1    May 9, 2019

(51) Int. Cl.
*G06F 1/08* (2006.01)
*H03K 5/24* (2006.01)
(Continued)

(52) U.S. Cl.
CPC .............. *G06F 21/76* (2013.01); *G06F 1/08* (2013.01); *H03K 3/0315* (2013.01); *H03K 5/24* (2013.01); *H03K 19/17768* (2013.01)

(58) Field of Classification Search
CPC ... G06F 1/08; G06F 21/76; G06F 1/28; G06F 30/34; G06F 1/04; H03K 3/0315; H03K 5/24; H03K 19/17768; H03K 19/008; H03K 19/20; H03K 5/133; H03K 19/00315; H03K 19/00369; H03K 19/003; G11C 29/028; G11C 29/021; G11C 29/023; G11C 29/02; G11C 2029/0409; G11C 2029/0411; G11C 29/56012; G11C 2029/0403; G11C 29/52; (Continued)

(56) References Cited

U.S. PATENT DOCUMENTS 9,356,506 B1 * 5/2016 Ho .......................... H02M 3/07
2018/0034793 A1    2/2018 Kibalo et al.
(Continued)

OTHER PUBLICATIONS

Ting Lu et al., "Secure Device Manager for Intel® Stratix® 10 Devices Provides FPGA and SoC Security," Intel Corp. White Paper, pp. 1-6.

*Primary Examiner* — John W Poos
(74) *Attorney, Agent, or Firm* — IventIQ Legal LLP; Steven J. Cahill (57) ABSTRACT

An integrated circuit includes a comparator circuit that generates a control signal based on a comparison between a threshold voltage and a supply voltage. The integrated circuit also includes a clock signal generation circuit that generates a clock signal and that receives the control signal. The clock signal generation circuit decreases a frequency of the clock signal to a reduced frequency in response to the control signal indicating that the supply voltage has decreased below the threshold voltage. The integrated circuit also includes a secure device manager circuit that has a timing circuit. The clock signal is provided to a clock input of the timing circuit. The timing circuit receives supply current from the supply voltage. The secure device manager circuit performs a security function for the integrated circuit using the timing circuit in response to the clock signal with the reduced frequency.

20 Claims, 6 Drawing Sheets

(51) Int. Cl.
*H03K 3/03* (2006.01)
*H03K 19/17768* (2020.01)
*G06F 21/76* (2013.01)

(58) Field of Classification Search
CPC ............ G11C 2029/0405; G11C 29/06; G11C 229/0407; G11C 29/006; G11C 29/54; G11C 2029/0401
See application file for complete search history.

(56) References Cited

U.S. PATENT DOCUMENTS

| | | | |
|---|---|---|---|
| 2018/0095115 A1* | 4/2018 | Fukuoka | ............... H03K 3/0315 |
| 2019/0004562 A1* | 1/2019 | Gupta | ........................ G06F 1/14 |
| 2020/0286574 A1* | 9/2020 | Kunz | ....................... G05F 1/575 |

* cited by examiner

TECHNIQUES FOR PREVENTING VOLTAGE TAMPERING OF SECURITY CONTROL CIRCUITS

FIELD OF THE DISCLOSURE

The present disclosure relates to electronic circuits, and more particularly, to techniques for preventing voltage tampering of security control circuits.

BACKGROUND

The Stratix® 10 field programmable gate array (FPGA) integrated circuit manufactured by Intel Corporation of Santa Clara, Calif. contains a Security Device Manager (SDM) that is responsible for ensuring that the FPGA is secure for configuration, testing, entering/exiting user modes, unloading configuration data, and other functions. During design implementation, the SDM signs off timing in a targeted maximum clock signal frequency for an intended operating voltage. The clock signal used for security functions is generated on the FPGA die.

Hackers could attempt voltage tampering by lowering a supply voltage provided to the FPGA to create a voltage glitch that causes a reduction in the supply voltage provided to the SDM. The reduced supply voltage may cause the SDM to violate the timing sign off window, for example, causing a setup time failure if the logic slow down caused by a low supply voltage is more than the reduction in the frequency of the clock signal. If the SDM security functions fail in response to the voltage tampering, the SDM security check logic may be bypassed, potentially allowing content to be stolen from a secured region of the FPGA.

One way to prevent this type of attack on the SDM is to reset the SDM when the supply voltage is below a threshold voltage. The supply voltage is compared to the threshold voltage using a comparator on the FPGA. In response to the comparator detecting that the supply voltage is less than the threshold voltage, the SDM is reset, and the configuration of the FPGA is prevented to stop the attack.

DETAILED DESCRIPTION

As discussed above, the operation of a field programmable gate array (FPGA) can be halted to stop an attack on the Security Device Manager (SDM) by resetting the SDM and halting the operation of the FPGA. However, this solution is not ideal, because it blocks operation of the FPGA if, for example, the supply voltage decreases below the threshold voltage in response to supply voltage noise. The FPGA is prevented from being used until the supply voltage increases above the threshold voltage again.

According to some embodiments disclosed herein, a comparator compares a supply voltage that is provided to the SDM to a threshold voltage. In response to the comparator detecting that the supply voltage is less than the threshold voltage, a clock signal generation circuit decreases the frequency of a clock signal provided to the SDM. The SDM performs security functions in response to the clock signal. The SDM can perform the security functions to block any attacks while the supply voltage is less than the threshold voltage in response to the reduced frequency clock signal, without experiencing timing violations. The SDM is not reset, and the operation of the integrated circuit is not interrupted during a low supply voltage caused by noise or by an attack. The integrated circuit continues to function as intended without being compromised by an attack while the supply voltage is less than the threshold voltage.

Figure 1:
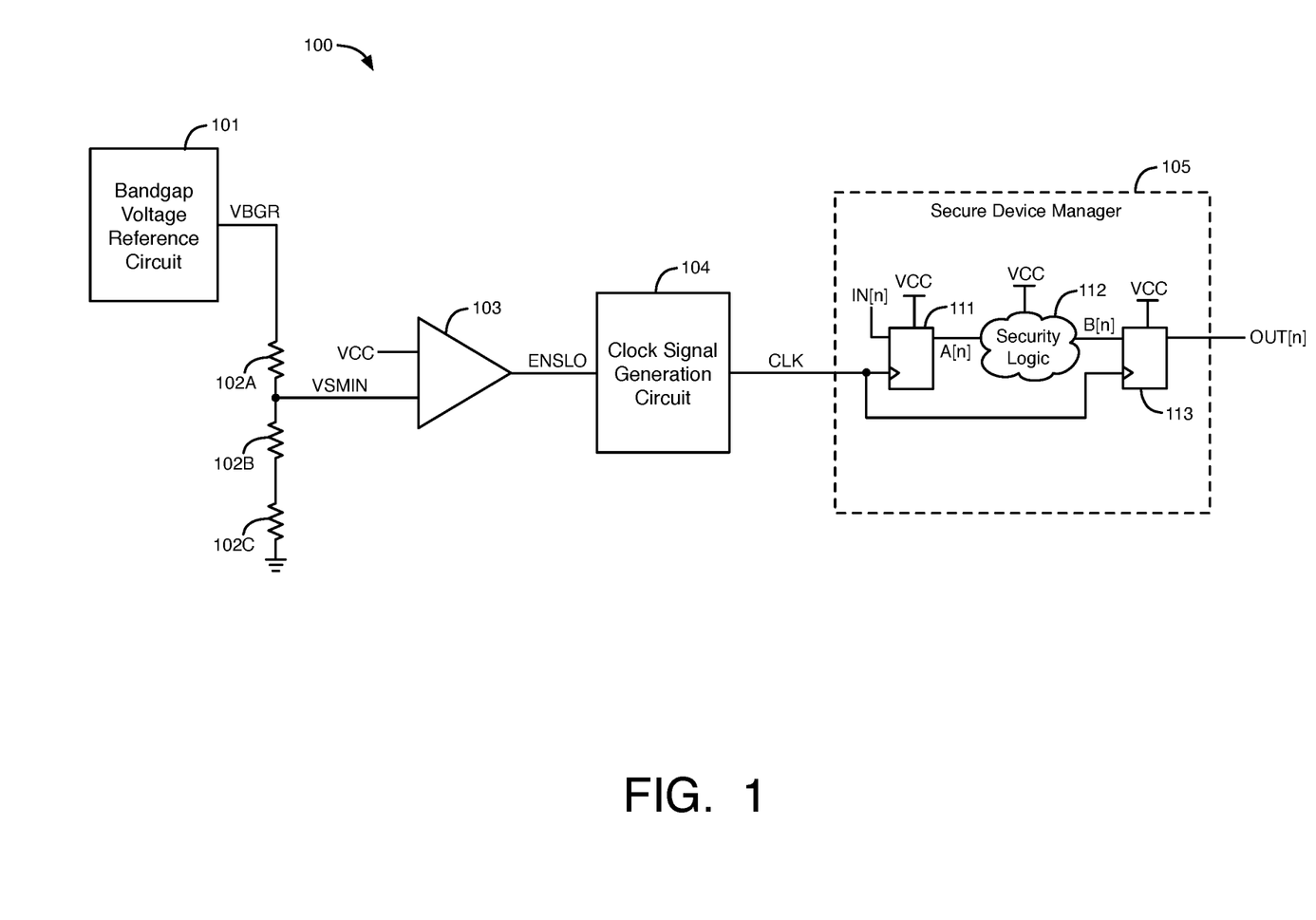
FIG. 1 illustrates an example of a voltage monitoring circuit system for monitoring a supply voltage provided to a secure device manager (SDM), according to an embodiment.

FIG. 1 illustrates an example of a voltage monitoring circuit system 100 for monitoring a supply voltage provided to a secure device manager (SDM), according to an embodiment. The voltage monitoring circuit system 100 of Figure (FIG. 1 includes bandgap voltage reference circuit 101, 3 resistors 102A-102C, comparator circuit 103, clock signal generation circuit 104, and secure device manager (SDM) circuit 105. The circuits 101-105 in voltage monitoring circuit system 100 are all in a single integrated circuit (IC) die. The IC die can be, for example, a programmable logic IC, such as a field programmable gate array (FPGA), a processor IC, such as a central processing unit or a microprocessor, a graphics processing unit (GPU), or another type of IC.

Bandgap voltage reference circuit 101 is a temperature independent voltage reference circuit that generates a fixed voltage VBGR that remains constant over power supply variations, temperature changes, and changes in circuit loading. Resistors 102A, 102B, and 102C are coupled in series between circuit 101 and ground to form a resistor divider circuit. The resistor divider circuit generates a threshold voltage VSMIN between resistors 102A and 102B by dividing voltage VBGR. The resistances of resistors 102A-102C are selected to generate a threshold voltage VSMIN that is equal to or greater than the minimum supply voltage required for SDM 105 to perform the security functions without experiencing timing violations (e.g., setup violations in flip-flops), while an input clock signal CLK is oscillating at its normal frequency. As an example that is not intended to be limiting, the resistances of resistors 102A-102C may be selected to generate a threshold voltage VSMIN that is 70%-80% of supply voltage VCC.

The threshold voltage VSMIN is provided to a first input of comparator circuit 103. A supply voltage VCC is provided to a second input of comparator circuit 103. Comparator circuit 103 compares the supply voltage VCC to the threshold voltage VSMIN to generate an output signal ENSLO. The output signal ENSLO of the comparator circuit 103 is provided to an input of the clock signal generation circuit 104. ENSLO is a control signal that controls the frequency of the clock signal CLK generated by clock signal generation circuit 104, as described in further detail below.

SDM 105 can, for example, be implemented in a processor. The processor may be a dedicated processor, special boot-up code for a user-visible processor already included in the device's design, or another suitable arrangement. SDM 105 includes flip-flop circuits 111 and 113. Flip-flops 111 and 113 are timing circuits. SDM 105 is also referred to herein as a security control circuit. Clock signal generation circuit 104 generates a clock signal CLK that is provided to clock inputs of flip-flops 111 and 113 in SDM 105, as shown in FIG. 1. Clock signal CLK can also be provided to other circuits in SDM 105. Clock signal generation circuit 104 can be, for example, an oscillator circuit, a phase-locked loop circuit, or a delay-locked loop circuit.

SDM 105 also includes security logic circuitry 112. Security logic 112 can perform one or more security related functions, such as encryption, decryption, authentication, hashing, signature checking, encryption key generation (e.g., using a physically unclonable function), encryption key rotation, encryption key storage, etc. SDM 105 can use encryption keys, for example, for securing and authenticating communication with external devices, encrypting and decrypting data traffic in user applications between the IC and external devices or between different sectors of the IC, encrypting and decrypting configuration data, and/or applying new signatures to data processed within the IC. SDM 105 can, for example, manage encryption keys, distribute configuration data for configuring an FPGA, send command and control data to local control circuits on the IC, authenticate and decrypt its own executable code, authenticate and decrypt configuration data, control the communication of debug, command, and control data between sectors of logic circuits on the IC, authenticate server generated debug, command, and control data, control the communication of the authenticated server generated data to and from the sectors, and/or provide an interface for configuration, command and debug channels to and from server infrastructure logic and for communication with resources external to the integrated circuit (IC).

The same supply voltage VCC that is provided to an input of comparator circuit 103 is also provided to supply inputs of flip-flops 111 and 113 and security logic 112. Supply current is provided from the supply voltage VCC to the flip-flop circuits 111 and 113 and to security logic 112. VCC is the supply voltage for circuits in SDM 105, including circuits 111-113. SDM 105 can also include numerous additional flip-flop circuits for storing data provided to security logic 112 and generated by security logic 112.

SDM 105 can, for example, generate an output OUT[n] in response to an input IN[n]. An n number of input signals IN[n] are stored in multiple flip-flops 111 as signals A[n] in response to clock signal CLK. Security logic 112 performs one or more security functions using input signals A[n] to generate output signals B[n]. Output signals B[n] are stored in multiple flip-flops 113 as output signals OUT[n] in response to clock signal CLK. As an example of a security function that security logic 112 can perform, security logic 112 can decrypt configuration data for an FPGA prior to configuring the FPGA with the decrypted configuration data. As another example of a security function that security logic 112 can perform, security logic 112 can perform an authentication function prior to allowing the FPGA to enter or exit user mode. As another example of a security function that security logic 112 can perform, security logic 112 can perform an authentication function prior to allowing the FPGA to enter or exit configuration mode during which the FPGA is configured with decrypted configuration data.

In response to the supply voltage VCC being greater than the threshold voltage VSMIN, comparator circuit 103 causes its output signal ENSLO to be in a first logic state. In response to signal ENSLO being in the first logic state, clock signal generation circuit 104 causes the frequency of clock signal CLK to be at a normal frequency or within a normal range of frequencies. SDM circuit 105 can perform its security functions and generate a valid output OUT[n] while the clock signal CLK is at the normal frequency or within the normal range of frequencies.

In response to the supply voltage VCC decreasing below the threshold voltage VSMIN, comparator circuit 103 changes signal ENSLO to a second logic state. In response to the second logic state in signal ENSLO, clock signal generation circuit 104 decreases the frequency of clock signal CLK to a reduced frequency that is less than the normal frequency of CLK or less than the normal range of frequencies of CLK. Comparator circuit 103 maintains signal ENSLO in the second logic state in response to the supply voltage VCC being less than threshold voltage VSMIN. While signal ENSLO is in the second logic state, clock signal generation circuit 104 maintains the frequency of clock signal CLK at the reduced frequency. In response to signal ENSLO being in the second logic state, clock signal generation circuit 104 reduces the frequency of clock signal CLK to a reduced frequency that allows flip-flop circuits 111 and 113 to store signals IN[n] and B[n], respectively, without setup or hold violations, while supply voltage VCC is less than voltage VSMIN. Reducing the frequency of clock signal CLK allows SDM 105 to perform the security functions and generate a valid output OUT[n], without experiencing timing violations in flip-flops 111 and 113. Thus, the voltage monitoring circuit system 100 of FIG. 1 allows SDM 105 and the integrated circuit to continue functioning during a low supply voltage VCC caused by supply voltage noise or by an attack.

Figure 2:
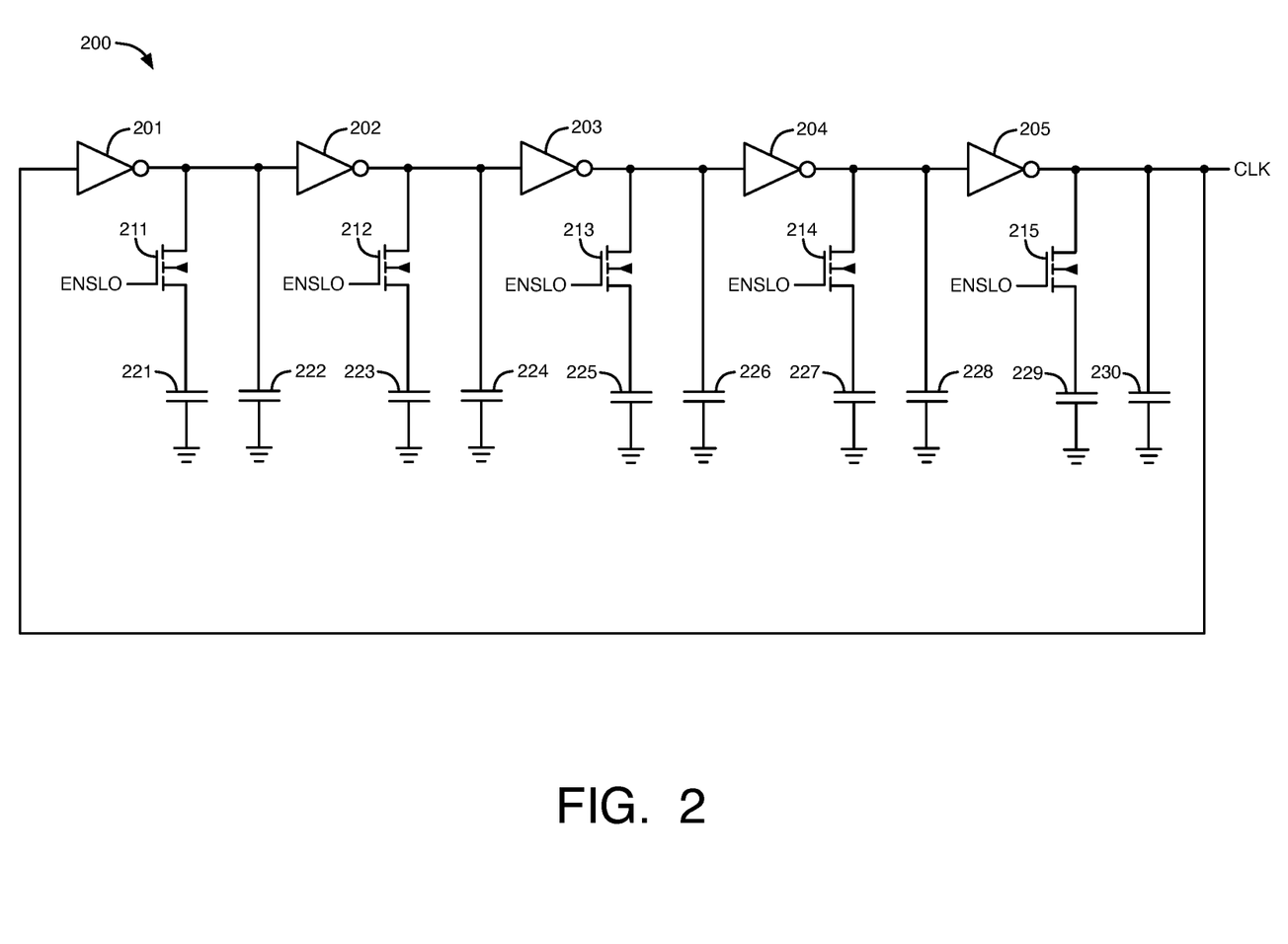
FIG. 2 illustrates an example of a ring oscillator circuit, according to an embodiment.

FIG. 2 illustrates an example of a ring oscillator circuit 200, according to an embodiment. Ring oscillator circuit 200 shown in FIG. 2 is an example of clock signal generation circuit 104 shown in FIG. 1. Ring oscillator circuit 200 includes 5 inverter circuits 201-205, 5 n-channel enhancement metal oxide semiconductor field effect transistors (MOSFETs) 211-215, and 10 capacitors 221-230. The 5 inverter circuits 201-205 are coupled in series in a loop that forms the ring oscillator. The clock signal CLK is generated at the output of inverter circuit 205. Capacitors 222, 224, 226, 228, and 230 are coupled between the outputs of inverter circuits 201-205, respectively, and ground. Transistors 211-215 are coupled between the outputs of inverter circuits 201-205 and capacitors 221, 223, 225, 227, and 229, respectively. Each of capacitors 221-230 is coupled to a terminal at a ground voltage. Oscillator 200 can, for example, be part of a phase-locked loop circuit or a delay-locked loop circuit.

The output signal ENSLO of comparator circuit 103 is provided to the gate of each of transistors 211, 212, 213, 214, and 215. In the embodiment of FIG. 2, the first logic state of signal ENSLO is a logic low state, and the second logic state of signal ENSLO is a logic high state. In response to signal ENSLO being in a logic low state when the supply voltage VCC is greater than the threshold voltage VSMIN, each of the 5 transistors 211-215 is off. When transistors 211-215 are off, capacitors 221, 223, 225, 227, and 229 are decoupled from the outputs of inverter circuits 201-205, respectively. As a result, oscillator circuit 200 causes clock signal CLK to be at its normal frequency.

In response to signal ENSLO being in a logic high state when the supply voltage VCC is less than the threshold voltage VSMIN, each of the 5 transistors 211-215 is on. When transistors 211-215 are on, capacitors 221, 223, 225, 227, and 229 are coupled through transistors 211-215 to the outputs of inverter circuits 201-205, respectively. The additional capacitances added by capacitors 221, 223, 225, 227, and 229 at the outputs of inverter circuits 201-205, respectively, causes oscillator circuit 200 to decrease the frequency of clock signal CLK to a reduced frequency. SDM 105 can perform the security functions while supply voltage VCC is less than threshold voltage VSMIN in response to the reduced frequency of clock signal CLK, without experiencing timing violations. The capacitances of capacitors 221-230 are selected such that clock signal CLK decreases to a frequency that allows SDM 105 to continue to perform the security functions without timing violations in response to ENSLO being in a logic high state. As examples that are not intended to be limiting, the reduced frequency of clock signal CLK may be one-half, one-third, one-quarter, etc. of its normal frequency.

Figure 3:
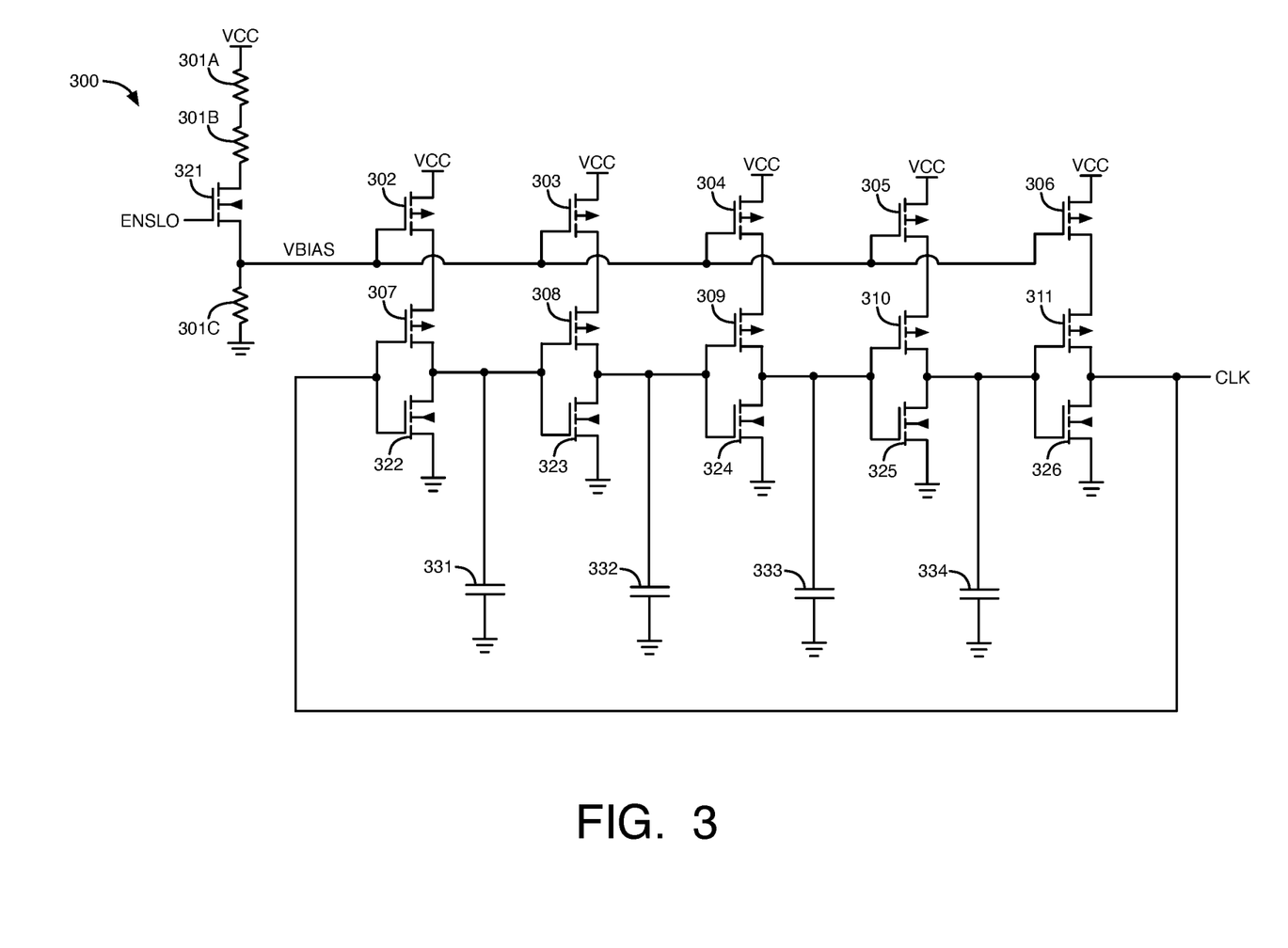
FIG. 3 illustrates another example of a ring oscillator circuit, according to an embodiment.

FIG. 3 illustrates another example of a ring oscillator circuit 300, according to an embodiment. Ring oscillator circuit 300 shown in FIG. 3 is another example of clock signal generation circuit 104 shown in FIG. 1. Ring oscillator circuit 300 includes 3 resistors 301A-301C, 10 p-channel enhancement metal oxide semiconductor field effect transistors (MOSFETs) 302-311, 6 n-channel enhancement MOSFETs 321-326, and 4 capacitors 331-334. Oscillator 300 can, for example, be part of a phase-locked loop circuit or a delay-locked loop circuit.

Transistors 307 and 322 are coupled to form a first inverter circuit. Transistors 308 and 323 are coupled to form a second inverter circuit. Transistors 309 and 324 are coupled to form a third inverter circuit. Transistors 310 and 325 are coupled to form a fourth inverter circuit. Transistors 311 and 326 are coupled to form a fifth inverter circuit. These 5 inverter circuits are coupled in series in a loop that forms the ring oscillator. Capacitors 331-334 are coupled between the outputs of the first, second, third, and fourth inverter circuits, respectively, and ground. The first, second, third, and fourth inverter circuits generate output voltages on capacitors 331, 332, 333, and 334, respectively. The fifth inverter circuit generates clock signal CLK at its output. Transistors 302-306 are coupled between the sources of transistors 307-311, respectively, a terminal at supply voltage VCC. The gate of each of transistors 302-306 is coupled to a node between resistor 301C and transistor 321.

The output signal ENSLO of comparator circuit 103 is provided to the gate of n-channel transistor 321. In the embodiment of FIG. 3, the first logic state of signal ENSLO is a logic low state, and the second logic state of signal ENSLO is a logic high state. In response to the supply voltage VCC being greater than the threshold voltage VSMIN, signal ENSLO is in a logic low state, causing n-channel transistor 321 to be off. When transistor 321 is off, resistor 301C is decoupled from the supply voltage VCC. As a result, the bias voltage VBIAS at the node between resistor 301C and the source of transistor 321 is at the ground voltage. In response to voltage VBIAS being at the ground voltage, p-channel transistors 302-306 are fully on in their saturation regions. As a result, the supply current provided from the terminal at supply voltage VCC through transistors 302-306 to transistors 307-311, respectively, is at or near its maximum value. The supply current through transistors 302-306 flows through the first, second, third, fourth, and fifth inverter circuits, respectively. These 5 inverter circuits toggle their output voltages at the normal frequency when the supply current is at or near its maximum value. Thus, in response to signal ENSLO being in a logic low state, the supply current is at or near its maximum value, and as a result, ring oscillator 300 causes clock signal CLK to oscillate at its normal frequency.

In response to the supply voltage VCC being less than the threshold voltage VSMIN, signal ENSLO is in a logic high state, causing n-channel transistor 321 to be on. When transistor 321 is on, resistors 301A-301B, transistor 321, and resistor 301C are coupled to form a resistor divider circuit. Current flows from supply voltage VCC through the resistor divider to ground, and as a result, the bias voltage VBIAS increases above the ground voltage to a voltage that is based on the ratio of the resistances of resistors 301A-301C and transistor 321. The increased bias voltage VBIAS reduces the supply current that flows from the terminal at supply voltage VCC through p-channel transistors 302-306 to transistors 307-311, respectively. The reduced supply current flows through the first, second, third, fourth, and fifth inverter circuits. The reduced supply current through the first, second, third, fourth, and fifth inverter circuits causes these inverter circuits to toggle the voltages on capacitors 331-334 and the voltage of clock signal CLK more slowly. As a result, clock signal CLK has a reduced frequency in response to signal ENSLO being in a logic high state. SDM 105 can perform the security functions while supply voltage VCC is less than threshold voltage VSMIN in response to the reduced frequency of clock signal CLK, without experiencing timing violations. The resistances of resistors 301A-301C are selected such that clock signal CLK decreases to a reduced frequency that allows SDM 105 to continue to perform the security functions without timing violations in response to signal ENSLO being in a logic high state.

According to another embodiment disclosed herein, a comparator compares the supply voltage that is provided to the SDM to a threshold voltage. In response to the comparator detecting that the supply voltage is less than the threshold voltage, the comparator disables input and output pads of the integrated circuit. The comparator can, for example, disable input and output pads in the integrated circuit that are intended to transmit user data and/or configuration data for configuring an FPGA. In this embodiment, the operation of the integrated circuit is interrupted during a low supply voltage caused, for example, by noise or by an attack.

Figure 4:
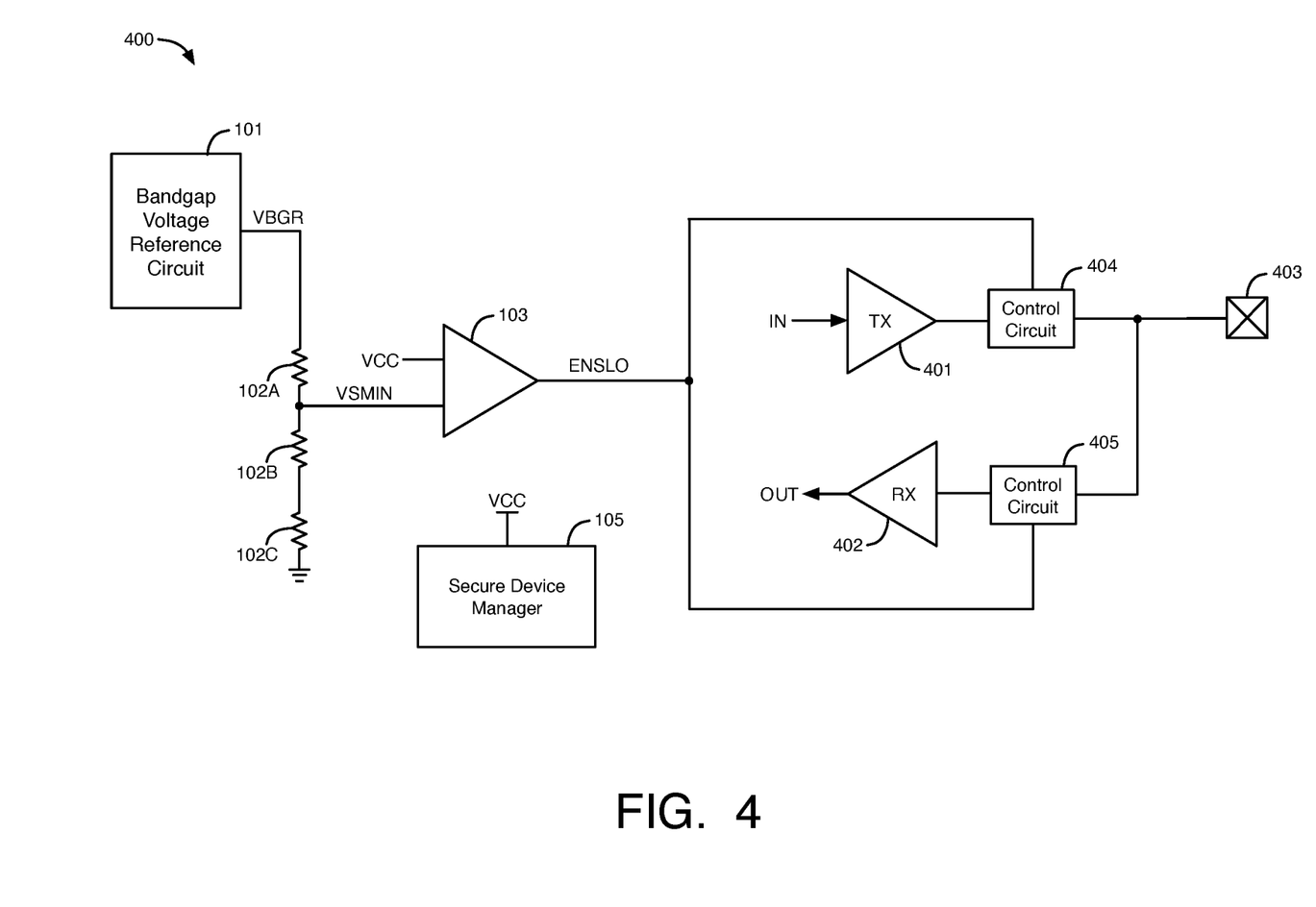
FIG. 4 illustrates another example of a voltage monitoring circuit system for monitoring a supply voltage provided to a secure device manager (SDM), according to an embodiment.

FIG. 4 illustrates another example of a voltage monitoring circuit system 400 for monitoring a supply voltage provided to a secure device manager (SDM), according to an embodiment. The voltage monitoring circuit system 400 of FIG. 4 includes bandgap voltage reference circuit 101, resistors 102A-102C, comparator circuit 103, secure device manager (SDM) circuit 105, output buffer circuit 401, input buffer circuit 402, input/output (IO) pad 403, and control circuits 404-405. All of the circuits shown in FIG. 4 are in a single integrated circuit (IC) die. The IC die can be, for example, a programmable logic IC, such as a field programmable gate array (FPGA), a processor IC, such as a central processing unit or a microprocessor, a graphics processing unit (GPU), or another type of IC.

Bandgap voltage reference circuit 101, resistors 102A-102C, and comparator circuit 103 in voltage monitoring circuit system 400 operate as described above with respect to FIG. 1. Control circuit 404 is coupled between IO pad 403 and an output of output buffer circuit 401. Control circuit 405 is coupled between IO pad 403 and an input of input buffer circuit 402. IO pad 403 is an external terminal of the IC through which an input signal can be transmitted to the IC from a source that is external to the IC. Alternatively, an output signal generated within the IC can be transmitted through IO pad 403 to a device external to the IC.

In the embodiment of FIG. 4, the output signal ENSLO of comparator circuit 103 is provided to a control input of each of control circuits 404-405. Control circuit 404 is responsive to signal ENSLO to allow or block signal transmission between output buffer circuit 401 and IO pad 403. Control circuit 405 is responsive to signal ENSLO to allow or block signal transmission between IO pad 403 and input buffer circuit 402.

In response to the supply voltage VCC being greater than the threshold voltage VSMIN, comparator circuit 103 causes its output signal ENSLO to be in a first logic state. In response to signal ENSLO being in the first logic state, control circuit 404 allows the output signal of output buffer 401 to propagate to IO pad 403, and control circuit 405 allows an input signal received at IO pad 403 to propagate to input buffer 402. Output buffer circuit 401 can buffer an input signal IN generated by circuitry in the IC to generate an output signal that is transmitted through control circuit 404 and IO pad 403 to a device outside the IC. An input signal received at the IC from a source outside the IC can be transmitted through IO pad 403 and control circuit 405 to an input of input buffer circuit 402. Input buffer circuit 402 can buffer the input signal to generate an output signal OUT that is provided to other circuitry in the IC. Other circuitry (not shown) in the IC determines whether the output buffer 401 and/or the input buffer 402 is enabled for data transmission.

In response to the supply voltage VCC being less than the threshold voltage VSMIN, comparator circuit 103 causes its output signal ENSLO to be in a second logic state. In response to signal ENSLO being in the second logic state, control circuit 404 blocks the output signal of output buffer 401 from propagating to IO pad 403, and control circuit 405 blocks any input signals received at IO pad 403 from propagating to input buffer 402. Additional control circuits 404-405 are coupled to the other IO pads in the IC that can transmit data signals. These additional control circuits 404-405 are also responsive to signal ENSLO to block signal transmission to and from the data signal pads when supply voltage VCC is below threshold voltage VSMIN. Thus, the embodiment of FIG. 4 prevents an attacker from transmitting data signals to or receiving data signals from the IC when VCC is less than VSMIN, preventing data from being stored in the IC or read from the IC. When supply voltage VCC increases above voltage VSMIN again, signal ENSLO returns to the first logic state, causing all of the control circuits 404-405 in the IC to allow signal transmission to and from the IO pads of the IC again. SDM 105 is able to perform security functions when VCC is greater than VSMIN again.

Control circuits 404-405 can be, for example, NAND logic gates, AND logic gates, or pull-down logic circuits that include n-channel MOSFETs coupled between IO pad 403 and ground. If control circuits 404-405 are AND logic gates, the second logic state of signal ENSLO is a logic low state. In response to signal ENSLO being in a logic low state, the AND gate in control circuit 404 maintains the voltage at IO pad 403 in a logic low state, and the AND gate in control circuit 405 maintains the voltage at the input of input buffer 402 in a logic low state, blocking signal transmission to and from IO pad 403.

If control circuits 404-405 are NAND logic gates, the second logic state of signal ENSLO is a logic low state. In response to signal ENSLO being in a logic low state, the NAND gate in control circuit 404 maintains the voltage at IO pad 403 in a logic high state, and the NAND gate in control circuit 405 maintains the voltage at the input of input buffer 402 in a logic high state, blocking signal transmission to and from IO pad 403.

If control circuits 404-405 are pull-down logic circuits, the second logic state of signal ENSLO is a logic high state. In response to signal ENSLO being in a logic high state, the n-channel MOSFETs in control circuit 404 maintain the voltage at IO pad 403 in a logic low state, and the n-channel MOSFETs in control circuit 405 maintain the voltage at the input of input buffer 402 in a logic low state, blocking signal transmission to and from IO pad 403.

Figure 5:
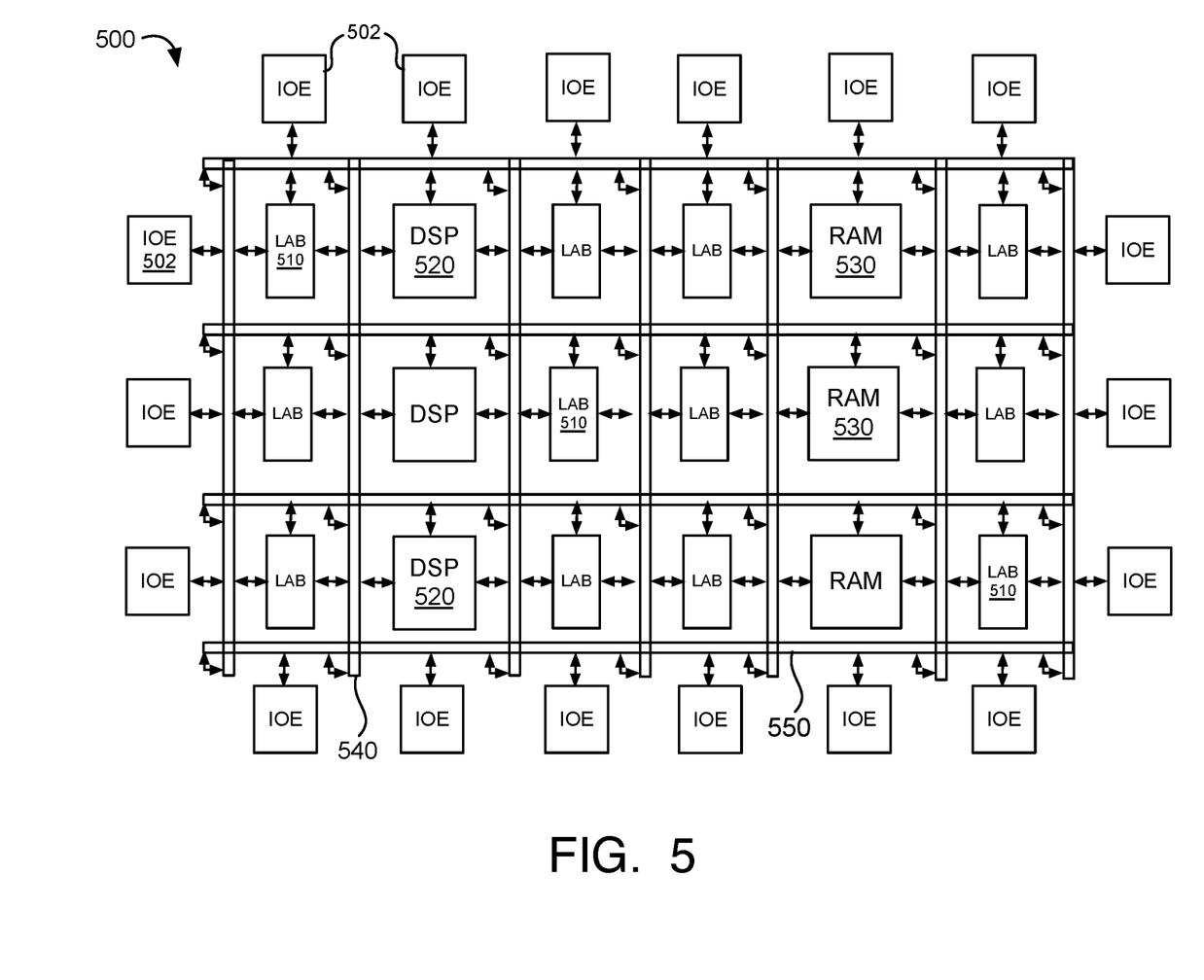
FIG. 5 illustrates an exemplary embodiment of a programmable logic integrated circuit (IC) that may contain embodiments disclosed herein, for example, with respect to FIGS. 1-4 and 6.

FIG. 5 illustrates an exemplary embodiment of a programmable logic integrated circuit (IC) 500 that may contain embodiments disclosed herein, for example, with respect to FIGS. 1-4 and 6. As shown in FIG. 5, the programmable logic integrated circuit (IC) 500 includes a two-dimensional array of configurable functional circuit blocks, including configurable logic array blocks (LABs) 510 and other functional circuit blocks, such as random access memory (RAM) blocks 530 and digital signal processing (DSP) blocks 520. Functional blocks such as LABs 510 may include smaller configurable regions (e.g., logic elements, logic blocks, or adaptive logic modules) that receive input signals and perform custom logic functions on the input signals to produce output signals.

In addition, programmable IC 500 has input/output elements (IOEs) 502 for driving signals off of programmable IC 500 and for receiving signals from other devices. Each of the IOEs 502 includes one or more input buffers, one or more output buffers, and one or more IO pads, such as IO pad 403. Input/output elements 502 may include parallel input/output circuitry, serial data transceiver circuitry, differential receiver and transmitter circuitry, or other circuitry used to connect one integrated circuit to another integrated circuit. As shown, input/output elements 502 may be located around the periphery of the chip. If desired, the programmable IC 500 may have input/output elements 502 arranged in different ways. For example, input/output elements 502 may form one or more columns, rows, or islands of input/output elements that may be located anywhere on the programmable IC 500.

The programmable IC 500 also includes programmable interconnect circuitry in the form of vertical routing channels 540 (i.e., interconnects formed along a vertical axis of programmable IC 500) and horizontal routing channels 550 (i.e., interconnects formed along a horizontal axis of programmable IC 500), each routing channel including at least one track to route at least one wire.

Note that other routing topologies, besides the topology of the interconnect circuitry depicted in FIG. 5, may be used. For example, the routing topology may include wires that travel diagonally or that travel horizontally and vertically along different parts of their extent as well as wires that are perpendicular to the device plane in the case of three dimensional integrated circuits. The driver of a wire may be located at a different point than one end of a wire.

Furthermore, it should be understood that embodiments disclosed herein with respect to FIGS. 1-4 and 6 may be implemented in any integrated circuit or electronic system. If desired, the functional blocks of such an integrated circuit may be arranged in more levels or layers in which multiple functional blocks are interconnected to form still larger blocks. Other device arrangements may use functional blocks that are not arranged in rows and columns.

Programmable IC 500 also contains programmable memory elements (e.g., in RAMs 530 or in LABs 510). The programmable memory elements can be loaded with configuration data via input/output elements (IOEs) 502 and SDM 105. Once loaded, the programmable memory elements each provide a corresponding static control signal that controls the operation of a logic circuit in an associated configurable functional block (e.g., LABs 510, DSP blocks 520, RAM blocks 530, and/or input/output elements 502).

In a typical scenario, the outputs of the loaded programmable memory elements are applied to the gates of metal oxide semiconductor field effect transistors (MOSFETs) in functional blocks (e.g., any of LAB blocks 510, DSP blocks 520, and RAM blocks 530) to turn certain transistors on or off and thereby configure the logic circuits in the functional blocks including the routing paths. Configurable logic circuit elements that can be controlled in this way include parts of multiplexers (e.g., multiplexers used for forming routing paths in interconnect circuits), look-up tables, logic arrays, AND, OR, NAND, and NOR logic gates, pass gates, etc.

The programmable memory elements can be organized in a configuration memory array including rows and columns. A data register that spans across all columns and an address register that spans across all rows may receive configuration data. The configuration data may be shifted onto the data register. When the appropriate address register is asserted, the data register writes the configuration data to the configuration memory bits of the row of the configuration memory array that was designated by the address register.

In certain embodiments, programmable IC 500 can include configuration memory that is organized in sectors, whereby a sector may include the configuration RAM bits that specify the functions and/or interconnections of the subcomponents and wires in or crossing that sector. Each sector can include separate data and address registers and configurable logic circuits.

The programmable IC 500 of FIG. 5 is merely one example of an IC that can include embodiments disclosed herein. The embodiments disclosed herein can be incorporated into any suitable integrated circuit or system. For example, the embodiments disclosed herein can be incorporated into numerous types of devices such as processor integrated circuits, central processing units, memory integrated circuits, graphics processing unit integrated circuits, application specific standard products (ASSPs), application specific integrated circuits (ASICs), and programmable logic integrated circuits. Examples of programmable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein may be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

Figure 6:
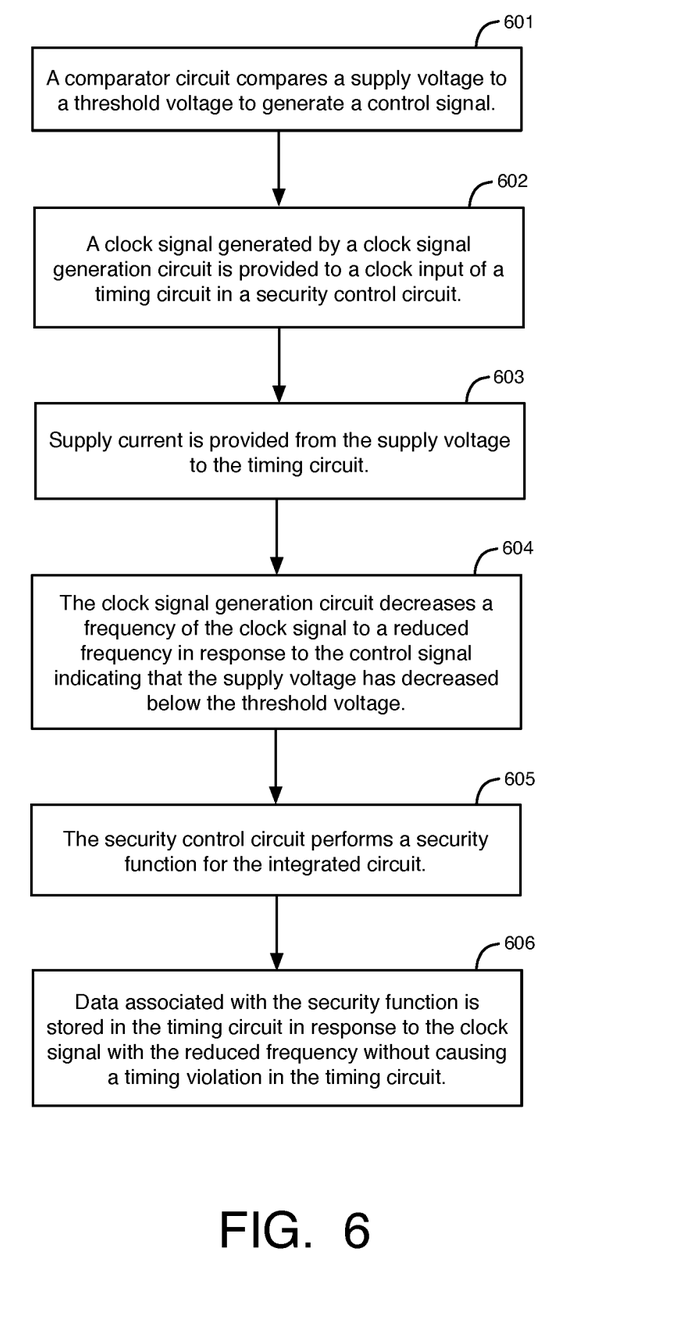
FIG. 6 is a flow chart that illustrates examples of operations that can be performed to prevent voltage tampering of a security control circuit in an integrated circuit, according to an embodiment.

FIG. 6 is a flow chart that illustrates examples of operations that can be performed to prevent voltage tampering of a security control circuit in an integrated circuit, according to an embodiment. In operation 601, a comparator circuit compares a supply voltage to a threshold voltage to generate a control signal. Comparator circuit 103 is an example of the comparator circuit of operation 601. In operation 602, a clock signal generated by a clock signal generation circuit is provided to a clock input of a timing circuit in a security control circuit. Clock signal generation circuit 104 is an example of the clock signal generation circuit of operation 602. SDM 105 is an example of the security control circuit of operation 602. Flip-flops 111 and 113 are each examples of the timing circuit of operation 602. In operation 603, supply current is provided from the supply voltage to the timing circuit. In operation 604, the clock signal generation circuit decreases a frequency of the clock signal to a reduced frequency in response to the control signal indicating that the supply voltage has decreased below the threshold voltage. In operation 605, the security control circuit performs a security function for the integrated circuit. The security function can, for example, be performed by security logic 112. In operation 606, data associated with the security function is stored in the timing circuit in response to the clock signal with the reduced frequency without causing a timing violation in the timing circuit. The data can be stored in the timing circuit before or after the security control circuit performs the security function in operation 605.

The following examples pertain to further embodiments. Example 1 is an integrated circuit comprising: a comparator circuit that generates a control signal based on a comparison between a threshold voltage and a supply voltage; a clock signal generation circuit that generates a clock signal and that receives the control signal, wherein the clock signal generation circuit decreases a frequency of the clock signal to a reduced frequency in response to the control signal indicating that the supply voltage has decreased below the threshold voltage; and a secure device manager circuit that comprises a first timing circuit, wherein the clock signal is provided to a clock input of the first timing circuit, wherein the first timing circuit receives supply current from the supply voltage, and wherein the secure device manager circuit performs a security function for the integrated circuit using the first timing circuit in response to the clock signal with the reduced frequency.

In Example 2, the integrated circuit of Example 1 can optionally include, wherein the clock signal generation circuit comprises a ring oscillator circuit.

In Example 3, the integrated circuit of Example 2 can optionally further include, wherein the ring oscillator circuit comprises: inverter circuits coupled in a loop; transistors; and capacitors, wherein each of the transistors is coupled between one of the inverter circuits and one of the capacitors, and wherein a control input of each of the transistors is coupled to receive the control signal from the comparator circuit.

In Example 4, the integrated circuit of Example 2 can optionally further include, wherein the ring oscillator circuit comprises: inverter circuits coupled in a loop; a first transistor comprising a control input coupled to receive the control signal from the comparator circuit; and second transistors, wherein each of the second transistors is coupled between a terminal at the supply voltage and a supply input of one of the inverter circuits, and wherein a control input of each of the second transistors is coupled to a terminal of the first transistor.

In Example 5, the integrated circuit of Example 4 can optionally further include, wherein the ring oscillator circuit further comprises: a first resistor coupled between a source of the first transistor and a terminal at a ground voltage; and a second resistor coupled to a drain of the first transistor, wherein the second resistor receives supply current from the supply voltage when the first transistor is on, and wherein the control inputs of the second transistors are coupled to the source of the first transistor.

In Example 6, the integrated circuit of any one of Examples 1-5 can optionally include, wherein the secure device manager circuit further comprises a second timing circuit and security logic circuitry, wherein the clock signal is provided to a clock input of the second timing circuit, wherein the security logic circuitry and the second timing circuit receive supply current from the supply voltage, and wherein the security logic circuitry performs the security function in response to input received from the first timing circuit and generates an output that is stored in the second timing circuit in response to the clock signal with the reduced frequency.

In Example 7, the integrated circuit of any one of Examples 1-6 can optionally further comprise: a bandgap voltage reference circuit that generates a bandgap reference voltage; and a resistor divider circuit that generates the threshold voltage using the bandgap reference voltage.

In Example 8, the integrated circuit of any one of Examples 1-7 can optionally include, wherein the integrated circuit is a programmable logic integrated circuit, and wherein the secure device manager circuit decrypts configuration data for configuring configurable logic circuits in the integrated circuit during a configuration mode and performs authentication of the configuration data prior to entering the configuration mode using the first timing circuit in response to the clock signal with the reduced frequency.

Example 9 is a method for preventing voltage tampering of a security control circuit in an integrated circuit, the method comprising: comparing a supply voltage to a threshold voltage with a comparator circuit to generate a control signal; providing a clock signal generated by a clock signal generation circuit to a clock input of a first timing circuit in the security control circuit; providing supply current from the supply voltage to the first timing circuit; decreasing a frequency of the clock signal to a reduced frequency with the clock signal generation circuit in response to the control signal indicating that the supply voltage has decreased below the threshold voltage; performing a security function for the integrated circuit with the security control circuit; and storing data associated with the security function in the first timing circuit in response to the clock signal with the reduced frequency without causing a timing violation in the first timing circuit.

In Example 10, the method of Example 9 can optionally include, wherein the clock signal generation circuit comprises a ring oscillator circuit.

In Example 11, the method of any one of Examples 9-10 can optionally include, wherein decreasing the frequency of the clock signal to the reduced frequency with the clock signal generation circuit in response to the control signal indicating that the supply voltage has decreased below the threshold voltage comprises: turning on a transistor in response to the control signal to couple a capacitor between an output of a first inverter circuit and an input of a second inverter circuit, wherein the second inverter circuit generates the clock signal at an output.

In Example 12, the method of any one of Examples 9-10 can optionally include, wherein decreasing the frequency of the clock signal to the reduced frequency with the clock signal generation circuit in response to the control signal indicating that the supply voltage has decreased below the threshold voltage comprises: increasing current through a first transistor and a resistor in response to the control signal; and decreasing current through second transistors and inverter circuits in response to the increased current through the first transistor and the resistor, wherein the inverter circuits are coupled in a loop, and wherein one of the inverter circuits generates the clock signal at an output.

In Example 13, the method of Example 12 can optionally include, wherein a control input of each of the second transistors is coupled to the first transistor and the resistor, and wherein each of the second transistors is coupled between a terminal at the supply voltage and a supply input of one of the inverter circuits.

In Example 14, the method of any one of Examples 9-13 can optionally further comprise: providing the clock signal to a clock input of a second timing circuit in the security control circuit; and providing supply current from the supply voltage to the second timing circuit and security logic circuitry in the security control circuit, wherein performing the security function for the integrated circuit with the security control circuit comprises performing the security function with the security logic circuitry in response to input received from the first timing circuit, and storing an output of the security logic circuitry in the second timing circuit in response to the clock signal with the reduced frequency without causing a timing violation in the second timing circuit.

In Example 15, the method of any one of Examples 9-14 can optionally include, wherein performing the security function for the integrated circuit with the security control circuit comprises: decrypting and authenticating configuration data with security logic circuitry in the security control circuit prior to entering a configuration mode; and configuring configurable logic circuits in the integrated circuit using the configuration data during the configuration mode.

Example 16 is an integrated circuit comprising: a comparator circuit that generates a control signal based on a comparison between a threshold voltage and a supply voltage; an input buffer circuit coupled to an input/output pad of the integrated circuit; a first control circuit that blocks signal transmission from the input/output pad to the input buffer circuit in response to the control signal indicating that the supply voltage is less than the threshold voltage; an output buffer circuit coupled to the input/output pad; and a second control circuit that blocks signal transmission from the output buffer circuit to the input/output pad in response to the control signal indicating that the supply voltage is less than the threshold voltage.

In Example 17, the integrated circuit of Example 16 can optionally further comprise: a bandgap voltage reference circuit that generates a bandgap reference voltage; and a resistor divider circuit that generates the threshold voltage using the bandgap reference voltage.

In Example 18, the integrated circuit of any one of Examples 16-17 can optionally further comprise: a secure device manager circuit that performs a security function for the integrated circuit, wherein the secure device manager circuit receives the supply voltage at a supply input.

In Example 19, the integrated circuit of any one of Examples 16-18 can optionally further include, wherein the first control circuit comprises a first AND or NAND logic gate circuit, and wherein the second control circuit comprises a second AND or NAND logic gate circuit.

In Example 20, the integrated circuit of any one of Examples 16-18 can optionally further include, wherein the first control circuit comprises a first pull-down logic circuit, and wherein the second control circuit comprises a second pull-down logic circuit.

The foregoing description of the exemplary embodiments of the present invention has been presented for the purpose of illustration. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. An integrated circuit comprising:
   a comparator circuit that generates a control signal based on a comparison between a threshold voltage and a supply voltage;
   a clock signal generation circuit that generates a clock signal and that receives the control signal, wherein the clock signal generation circuit decreases a frequency of the clock signal to a reduced frequency in response to the control signal indicating that the supply voltage has decreased below the threshold voltage; and
   a secure device manager circuit that comprises a first timing circuit, wherein the clock signal is provided to a clock input of the first timing circuit, wherein the first timing circuit receives supply current from the supply voltage, and wherein the secure device manager circuit performs a security function for the integrated circuit using the first timing circuit in response to the clock signal with the reduced frequency.

2. The integrated circuit of claim 1, wherein the clock signal generation circuit comprises a ring oscillator circuit.

3. The integrated circuit of claim 2, wherein the ring oscillator circuit comprises:
   inverter circuits coupled in a loop;
   transistors; and
   capacitors, wherein each of the transistors is coupled between one of the inverter circuits and one of the capacitors, and wherein a control input of each of the transistors is coupled to receive the control signal from the comparator circuit.

4. The integrated circuit of claim 2, wherein the ring oscillator circuit comprises:
   inverter circuits coupled in a loop;
   a first transistor comprising a control input coupled to receive the control signal from the comparator circuit; and
   second transistors, wherein each of the second transistors is coupled between a terminal at the supply voltage and a supply input of one of the inverter circuits, and wherein a control input of each of the second transistors is coupled to a terminal of the first transistor.

5. The integrated circuit of claim 4, wherein the ring oscillator circuit further comprises:
   a first resistor coupled between a source of the first transistor and a terminal at a ground voltage; and
   a second resistor coupled to a drain of the first transistor, wherein the second resistor receives supply current from the supply voltage when the first transistor is on, and wherein the control inputs of the second transistors are coupled to the source of the first transistor.

6. The integrated circuit of claim 1, wherein the secure device manager circuit further comprises a second timing circuit and security logic circuitry, wherein the clock signal is provided to a clock input of the second timing circuit, wherein the security logic circuitry and the second timing circuit receive supply current from the supply voltage, and wherein the security logic circuitry performs the security function in response to input received from the first timing circuit and generates an output that is stored in the second timing circuit in response to the clock signal with the reduced frequency.

7. The integrated circuit of claim 1, further comprising:
   a bandgap voltage reference circuit that generates a bandgap reference voltage; and
   a resistor divider circuit that generates the threshold voltage using the bandgap reference voltage.

8. The integrated circuit of claim 1, wherein the integrated circuit is a programmable logic integrated circuit, and wherein the secure device manager circuit decrypts configuration data for configuring configurable logic circuits in the integrated circuit during a configuration mode and performs authentication of the configuration data prior to entering the configuration mode using the first timing circuit in response to the clock signal with the reduced frequency.

9. A method for preventing voltage tampering of a security control circuit in an integrated circuit, the method comprising:
   comparing a supply voltage to a threshold voltage with a comparator circuit to generate a control signal;
   providing a clock signal generated by a clock signal generation circuit to a clock input of a first timing circuit in the security control circuit;
   providing supply current from the supply voltage to the first timing circuit;
   decreasing a frequency of the clock signal to a reduced frequency with the clock signal generation circuit in response to the control signal indicating that the supply voltage has decreased below the threshold voltage;
   performing a security function for the integrated circuit with the security control circuit; and
   storing data associated with the security function in the first timing circuit in response to the clock signal with the reduced frequency without causing a timing violation in the first timing circuit.

10. The method of claim 9, wherein the clock signal generation circuit comprises a ring oscillator circuit.

11. The method of claim 10, wherein decreasing the frequency of the clock signal to the reduced frequency with the clock signal generation circuit in response to the control signal indicating that the supply voltage has decreased below the threshold voltage comprises:
   turning on a transistor in response to the control signal to couple a capacitor between an output of a first inverter circuit and an input of a second inverter circuit, wherein the second inverter circuit generates the clock signal at an output.

12. The method of claim 10, wherein decreasing the frequency of the clock signal to the reduced frequency with the clock signal generation circuit in response to the control signal indicating that the supply voltage has decreased below the threshold voltage comprises:
   increasing current through a first transistor and a resistor in response to the control signal; and
   decreasing current through second transistors and inverter circuits in response to the increased current through the first transistor and the resistor, wherein the inverter circuits are coupled in a loop, and wherein one of the inverter circuits generates the clock signal at an output.

13. The method of claim 12, wherein a control input of each of the second transistors is coupled to the first transistor and the resistor, and wherein each of the second transistors is coupled between a terminal at the supply voltage and a supply input of one of the inverter circuits.

14. The method of claim 9, further comprising:
providing the clock signal to a clock input of a second timing circuit in the security control circuit; and
providing supply current from the supply voltage to the second timing circuit and security logic circuitry in the security control circuit,
wherein performing the security function for the integrated circuit with the security control circuit comprises performing the security function with the security logic circuitry in response to input received from the first timing circuit, and storing an output of the security logic circuitry in the second timing circuit in response to the clock signal with the reduced frequency without causing a timing violation in the second timing circuit.

15. The method of claim 9, wherein performing the security function for the integrated circuit with the security control circuit comprises:
decrypting and authenticating configuration data with security logic circuitry in the security control circuit prior to entering a configuration mode; and
configuring configurable logic circuits in the integrated circuit using the configuration data during the configuration mode.

16. An integrated circuit comprising:
a comparator circuit that generates a control signal based on a comparison between a threshold voltage and a supply voltage;
an input buffer circuit coupled to an input/output pad of the integrated circuit;
a first control circuit that blocks signal transmission from the input/output pad to the input buffer circuit in response to the control signal indicating that the supply voltage is less than the threshold voltage;
an output buffer circuit coupled to the input/output pad; and
a second control circuit that blocks signal transmission from the output buffer circuit to the input/output pad in response to the control signal indicating that the supply voltage is less than the threshold voltage.

17. The integrated circuit of claim 16, further comprising:
a bandgap voltage reference circuit that generates a bandgap reference voltage; and
a resistor divider circuit that generates the threshold voltage using the bandgap reference voltage.

18. The integrated circuit of claim 16, further comprising:
a secure device manager circuit that performs a security function for the integrated circuit, wherein the secure device manager circuit receives the supply voltage at a supply input.

19. The integrated circuit of claim 16, wherein the first control circuit comprises a first AND or NAND logic gate circuit, and wherein the second control circuit comprises a second AND or NAND logic gate circuit.

20. The integrated circuit of claim 16, wherein the first control circuit comprises a first pull-down logic circuit, and wherein the second control circuit comprises a second pull-down logic circuit.

* * * * *